(12) United States Patent
Seger

(10) Patent No.: US 11,485,446 B2
(45) Date of Patent: Nov. 1, 2022

(54) SINGLE-SIDED SWING ARM FOR A MOTORCYCLE

(71) Applicant: KTM AG, Mattighofen (AT)

(72) Inventor: Olaf Seger, Laufen (DE)

(73) Assignee: KTM AG, Mattighofen (AT)

( * ) Notice: Subject to any disclaimer, the term of this patent is extended or adjusted under 35 U.S.C. 154(b) by 409 days.

(21) Appl. No.: 16/793,992

(22) Filed: Feb. 18, 2020

(65) Prior Publication Data

US 2020/0269947 A1 Aug. 27, 2020

(30) Foreign Application Priority Data

Feb. 21, 2019 (DE) ............... 10 2019 104 462.6

(51) Int. Cl.
*B62K 25/20* (2006.01)

(52) U.S. Cl.
CPC ................. *B62K 25/20* (2013.01)

(58) Field of Classification Search
CPC ................. B62K 25/20; B62K 25/22
See application file for complete search history.

(56) References Cited

U.S. PATENT DOCUMENTS

| | | | |
|---|---|---|---|
| 4,794,998 A | 1/1989 | Iwai et al. | |
| 4,877,097 A | 10/1989 | Trema | |
| 7,121,570 B2 | 10/2006 | Parker | |
| 7,913,793 B2 * | 3/2011 | Kofuji | B62K 19/30 |
| | | | 180/227 |
| 8,083,018 B2 * | 12/2011 | Prielinger | B62K 25/283 |
| | | | 180/227 |
| 10,112,677 B2 * | 10/2018 | Ishii | B62K 25/005 |
| 2004/0026819 A1 | 2/2004 | Lum et al. | |
| 2006/0137928 A1 | 6/2006 | Parker | |

(Continued)

FOREIGN PATENT DOCUMENTS

| | | |
|---|---|---|
| DE | 102 32 892 A1 | 1/2004 |
| DE | 10 2014 016 455 A1 | 5/2015 |
| EP | 0 291 369 A1 | 11/1988 |

(Continued)

OTHER PUBLICATIONS

KTM AG, "Bedienungsanleitung 2019," Operator's Manual for 1290 Super Adventure S, Aug. 2018, Germany.

(Continued)

*Primary Examiner* — Tony H Winner
(74) *Attorney, Agent, or Firm* — Rod D. Baker

(57) ABSTRACT

A single-sided swing arm for a motorcycle having a traction means for driving a rear wheel of the motorcycle, the swing arm having a first section for rotatably supporting the rear wheel and second sections for pivotally attaching the swing arm to a structural member of the motorcycle. Geometrical centers of the first section and of the second sections define a virtual swing arm center plane, and a rocker arm with an upper side is between the first and the second sections. The rocker arm has a first side wall region and a second side wall region substantially opposite thereto, and the second side wall region extends into the region of a second section; the two side wall regions are connected to one another by a stiffening girder designed for the passage of the traction means. The stiffening girder extends into a region below the swing arm center plane.

16 Claims, 14 Drawing Sheets

(56) References Cited

U.S. PATENT DOCUMENTS

2015/0130161 A1  5/2015  Kawata et al.
2016/0318573 A1  11/2016  Ishii et al.

FOREIGN PATENT DOCUMENTS

| JP | 2010-228 557 A | 10/2010 |
| JP | 2015-137066 A | 7/2015 |
| JP | 2016-107929 A | 6/2016 |

OTHER PUBLICATIONS

KTM AG, "Bedienungsanleitung 2018," Operator's Manual for 1290 Super Duke R, Oct. 2017, Germany.

Intellectual Property India, "Examination Report," dated Nov. 15, 2021, on Applicant's corresponding Indian Patent Application No. 202044005847.

Japanese Patent Office, Office Action on Japanese Patent Application No. 2020-025508 (English translation) counterpart to U.S. Appl. No. 16/793,992 ), dated Feb. 16, 2021.

\* cited by examiner

SINGLE-SIDED SWING ARM FOR A MOTORCYCLE

CROSS-REFERENCE TO RELATED APPLICATIONS

This application claims priority to German Patent Application No. DE 10 2019 104 462.6, filed 21 Feb. 2019, the contents of which are incorporated herein by reference.

BACKGROUND OF THE INVENTION

Field of the Invention

The present invention relates to a single-sided swing arm for a motorcycle with a traction means for driving a rear wheel of the motorcycle.

Background Art

On the basis of DE 102 32 892 A1, a single-sided swing arm for a motorcycle with a cardan drive became known. This single-sided swing arm has a swing arm housing which is designed to accommodate the cardan drive.

Based on US 2006/0137928 A1, a single-sided swing arm has become known, which is intended for use with a motorcycle that has a traction means in the form of a drive chain for driving the rear wheel of the motorcycle. On this well-known motorcycle, the swing arm of the single-sided swing arm runs between the load transmitting strand and the idle strand of the drive chain.

A similar configuration has also become known from the U.S. Pat. No. 7,121,570 B2. The U.S. Pat. No. 4,794,998 A is another example of a single-sided swing arm with a swing arm that is arranged between the load transmitting strand and the idle strand of the drive chain.

Finally, also by the applicant that there is known a single-sided swing arm for a motorcycle with a traction device in the form of a drive chain, which has a first section for pivotally mounting the rear wheel and second sections for pivotally mounting the swing arm on a structural component of the motorcycle. In this known single-sided swing arm, geometric centers of the first section and the second sections span a virtual, in particular horizontally arranged swing arm center plane, and between the first and the second sections a swing arm having an upper side is provided, which has a first side wall region and a second side wall region largely opposite thereto, and the second side wall region extends into the region of a second section, and the two side wall regions are connected to a stiffening girder constructed for the passage of the traction means. This well-known single-sided swing arm is therefore characterized by the fact that the stiffening girder starts from the top of the swing arm, i.e. it is an top or upper side girder. Although this well-known single-sided swing arm has already proven itself in practice, it still has potential for improvement.

Depending on the driving situation, a single-sided swing arm of a motorcycle is subjected to a complex load spectrum, with torsional loads contributing a significant proportion of the load spectrum.

The well-known single-sided swing arm is pivotally fixed to a structural component of the motorcycle in the area of the second sections, and from the second sections the swing arm extends towards the first section, where the rear wheel is rotatably mounted.

The rear wheel is supported on the road surface by a tire, so that the tire contact force on the road surface results in a counterforce which stresses the swing arm in torsion, since the counterforce acts off-center on the swing arm. Lateral forces are also transmitted via the tire, which also load the swing arm on torsion.

The torsional loads can additively superimpose each other, which leads to a high torsional moment being applied to the swing arm, resulting in high torsional stresses in the structure of the rocker arm provided by a casting process.

A spring damper element is hinged to the well-known single-sided swing arm in the area of the top of the swing arm. The spring damper element or strut is directly hinged to the top of the swing arm, i.e. without any lever transmission or deflection between the hinge point and the strut. The rear wheel follows the unevenness of the ground when the motorcycle is moving, so that there is a relative movement of the rear wheel with respect to a reference point of the motorcycle, i.e. there is a wheel movement or a wheel lift or a compression movement, which has a different amount depending on the type of motorcycle, which may be in the range of 100 mm to 180 mm for example for motorcycles intended for riding on paved roads.

The wheel stroke of the rear wheel leads to a movement of the working piston of the spring damper element in the working cylinder and thus to a suspension strut stroke. The ratio of the suspension strut stroke to the wheel stroke changes in a non-linear way depending on the amount of wheel stroke. For reasons of comfort, a progressive design is aimed at, since such a design leads to a progressively increasing shock absorber stroke and in this way, due to the increasing travel of the working piston, a sensitive adjustment of the damping work performed by the working piston is possible by using spring washers or shims with comparatively low spring stiffness.

In view of the foregoing, the present invention is based on the object of further developing the single-sided swing arm in such a way that the dead weight of the single-sided swing arm is reduced and the torsional load acting on the single-sided swing arm is reduced. According to another aspect, it should also be possible to increase the progression of a spring damper element articulated to the single-sided swing arm to be created.

SUMMARY OF THE INVENTION (DISCLOSURE OF THE INVENTION)

There is provided a single-sided swing arm for a motorcycle having a traction means for driving a rear wheel of the motorcycle. The swing arm has a first section for rotatably supporting the rear wheel and second sections for pivotally attaching the swing arm to a structural member of the motorcycle. According to the present disclosure, the geometrical centers of the first section and of the second sections define a virtual swing arm center plane. A rocker arm or swinging arm having an upper side is provided between the first and the second sections. The rocker arm has a first side wall area and a second side wall area substantially opposite thereto, and the second side wall area extends into the region of a second section and the two side wall areas are connected to one another by a stiffening girder. The stiffening girder is designed for the passage of the traction means, wherein the stiffening girder extends into a region below the swing arm center plane.

The single-sided swing arm according to the invention has a stiffening girder which extends into an area below the swing arm center plane. The swing arm center plane is a virtual plane which is defined by the geometric centers of the first section for the pivoting mounting of the rear wheel of the motorcycle and by the second sections for the pivoting fixing of the single-sided swing arm to a structural component of the motorcycle.

BRIEF DESCRIPTION OF THE SEVERAL VIEWS OF THE DRAWING

The invention is explained in more detail below on the basis of the drawing. This shows in.

DETAILED DESCRIPTION OF THE INVENTION

Figure 1:
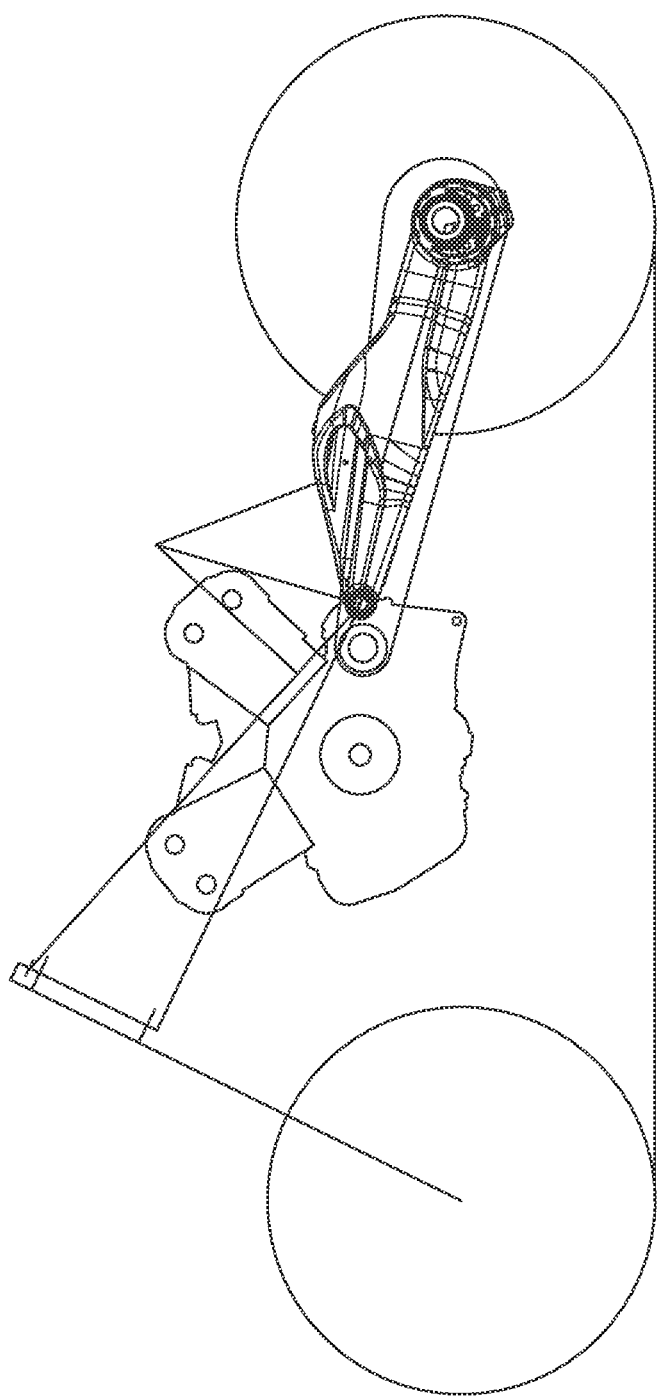
FIG. 1 is a schematic side view of a prior art motorcycle with a well-known single-sided swing arm.

The invention is a system and apparatus including a single-sided swing arm for a motorcycle having a traction means for driving a rear wheel of the motorcycle. The swing arm connects the rear wheel to the body of the motorcycle. The swing arm has a first section for rotatably supporting the rear wheel and second sections for pivotally attaching the swing arm to a structural member of the motorcycle. According to the present disclosure, the geometrical centers of the first section and of the second sections define a virtual swing arm center plane. A rocker arm or swinging arm having an upper side is provided between the first and the second sections. The rocker arm has a first side wall area and a second side wall area substantially opposite thereto, and the second side wall area extends into the region of a second section and the two side wall areas are connected to one another by a stiffening girder. The stiffening girder is designed for the passage of the traction means, wherein the stiffening girder extends into a region below the swing arm center plane.

The single-sided swing arm according to the invention is thus characterized by, among other things, the fact that the stiffening girder extends into an area below the swing arm center plane. The swing arm center plane is a virtual plane which is stretched up by the geometric centers of the first section (for the pivoting mounting of the rear wheel of the motorcycle) and by the second sections (for the pivoting fixing of the single-sided swing arm to a structural component of the motorcycle).

The structural component of the motorcycle may be, for example, a frame or frame component, or frame assembly of the motorcycle, the motorcycle's drive motor or, for example, a transmission housing or other structural component of the motorcycle to which the swing arm is pivotally attached by the second two sections.

The imaginary or virtual swing arm center plane is defined by these three geometric centers. The center plane and can be oriented relative to a road surface or horizon or wheel-rest plane, so it may be horizontal, for example, parallel to the road surface.

In relation to such the center plane of the swing arm, in a preferred embodiment the stiffening girder does not extend into an area above the center plane of the swing arm (as is the case with the well-known single-sided swing arm), but into an area below the center plane of the swing arm. This location of the girder offers significant advantages. In the case of the single-sided swing arm according to the present disclosure, the stiffening girder is therefore located closer to the road surface or wheel contact area—relative to the vertical axis direction of the motorcycle arranged in the intended manner on the road surface or wheel contact area—than is the case with the known single-sided swing arm. The clear distance between the road surface or wheel contact area and the lowest point of the stiffening girder (in the vertical axis direction of the single-sided swing arm) is therefore smaller than the clear distance between the road surface or wheel contact area and the lowest point of the known single-sided swing arm.

The arrangement of the stiffening girder below the center plane of the swing arm leads, compared to the known single-sided swing arm, to a shift of torsional stress-absorbing material of the single-sided swing arm into the area below the center plane of the swing arm. This in turn leads to a lowering of the thrust center of the swing arm of this single-sided swing arm compared to the thrust center of the known single-sided swing arm, and thus to a reduction of the lever arm via which the lateral force acting on the rear wheel can build up a torsional moment on the swing arm.

If, when riding a motorcycle with the known single-sided swing arm or the single-sided swing arm according to this disclosure, a lateral force is built up (which is assumed to be the same for reference purposes), this force leads to a higher torsional moment acting on the known single-sided swing arm than on the presently disclosed single-sided swing. Accordingly, a higher torsional load occurs in the structure or material of the swing arm of the known single-sided swing arm than in the swing arm of the present single-sided swing arm.

The single-sided swing arm according to this disclosure is a hollow component with an intended material distribution in the edge fiber area of the hollow component for absorbing torsional stresses.

Due to the reduction of the torsional load of the present single-sided swing arm, lower torsional loads occur in the edge fiber area (compared to the known single-sided swing arm), so that the material distribution of this single-sided swing arm can be designed in such a way that the wall thickness is reduced; thus the dead weight of this single-sided swing arm can also be reduced. This, in turn, reduces the influence of the inertial forces of this single-sided swing arm on the motorcycle, and thus improves driving dynamics.

Because the stiffening girder is integrated into this single-sided swing arm in the area below the swing arm center plane, a stiffened connection surface is also provided on the swing arm. The connection surface can be used to accommodate a spring damper element of the motorcycle, because the forces acting on the spring damper element are supported by the connecting surface thus provided. Functional integration thus is achieved by integrating the stiffening girder in the area below the center plane of the swing arm: namely on the one hand a distribution of the material for forming the swing arm in an area close to the wheel contact surface, thereby lowering the center of thrust and, on the other hand, providing an attachment surface for the spring damper element at a greater distance from the upper strut eye where the spring damper element is supported on a structural member of the motorcycle. This provides the capability to integrate a lever deflection on which the spring damper element can be supported, with which in turn the overall progression of the spring damper kinematics in connection with the invented single-sided swing arm can be significantly increased, and thus a gain in comfort can be achieved. This leads to a structural stiffening in the swing arm below the swing arm center plane, which contributes both to the lowering of the shear center and thus, due to the reduction of the lever arm length, to a reduction of the torsional stresses occurring in the swing arm in the event of torsion, and also allows the integration of a lever deflection into the rear wheel spring damper system.

It is also provided according to a further aspect of the apparatus that the swing arm has a rocker arm with a curved configuration, extending from the first section towards the second sections, and the upper side has an upper cover side wall arranged substantially parallel to the swing arm center plane.

As mentioned above, the integration of the stiffening girder into the structure of the present single-sided swing arm below the swing arm center plane contributes to a significant increase in the torsional stiffness of the single-sided swing arm below the swing arm center plane. The design of the upper cover side wall as a mostly flat cover side wall prevents the accumulation of material in an upper area at a distance from the center plane of the swing arm, which would counteract the lowering of the shear center.

It is also provided, according to a further aspect of the apparatus, that the rocker arm has a lower side wall running, at least in sections, at an angle to the swing arm center plane; the lower side wall is connected, at least in some sections, to the stiffening girder. Such a configuration assures that the material absorbing a torsional stress is concentrated below the center plane of the swing arm in an area connected to the stiffening girder, thereby increasing the torsional stiffness of the profile by increasing the moment of resistance to torsion. This makes it possible to reduce the wall thickness of the hollow profile structure to form the swing arm, and thus reduces the dead weight of this single-sided swing arm.

It is also provided according to a further aspect of the apparatus, that the two second sections are arranged at a clear distance from each other, and define an intermediate space or spacing, and that a connecting section extends from a first of the two second sections in the direction of the second of the two second sections; the connecting section has a respective arm section starting from the respective second section and the arm sections are connected to each other by means of a curved section. The curved section delimits the intermediate space with a front wall facing the two second sections. This configuration ensures that a space, serving as a receiving space for integrating a spring damper element into the structure of the single-sided swing arm, can be formed between the two second sections with which the single-sided swing arm in accordance with the invention is pivotably fixed to the structural component of the motorcycle. In this way, the spring damper element can pass through the spacing and a lower eye of the spring damper element can support itself on the attachment surface in the area of the underside of the single-sided swing arm (with the interposition of a lever kinematics with which the overall progression can be increased), and an upper eye of the spring damper element can extend through the spacing in the upward direction to be detachably attached to an attachment surface of the structural component.

It is also provided according to a further aspect of the apparatus, that an arm section allocated to the second side wall area has an upper cover side wall which is arranged mostly parallel to the center plane of the swing arm; in a top view, the upper cover side wall has a configuration widening towards the swing arm. The design of the upper cover side wall, which is largely parallel to the center plane of the swing arm, ensures that there is no undesirable upward displacement of the shear center; and the configuration of the arm section, which widens towards the swing arm, is a configuration that does justice to the load spectrum acting on the arm section, because tensile stresses are also superimposed in the area of the spacing adjoining the arm section, which are introduced via the spring leg connection eye located on the underside of the single-sided swing arm.

It is also provided according to a further aspect of the of the apparatus, that the first side wall area has an outer side wall extending from the first section in the direction of a second section, which is largely flat; and the swing arm, starting from the second section, has a configuration widening in cross-section in the direction of the connecting section.

The single-sided swing arm according to the present disclosure can be produced in a preferred manner by means of a casting process, and the largely flat design of the outer wall ensures that this area of the single-sided swing arm can be represented in the casting tool by means of a lateral slider—thus reducing the amount of mechanical post-processing required for the swing arm removed from the casting tool. And the configuration of the swing arm, which widens in cross-section in the direction of the connecting section, starting from the second section, ensures a design corresponding to the load spectrum acting on the swing arm.

It is also intended, according to a further aspect of the apparatus, that the swing arm, starting from the first section towards the connecting section, has a widening configuration in a plan view, whereby a configuration corresponding to the load collective acting on the swing arm is achieved and, in addition, the accumulation of material or material for forming the single arm swing arm according to the invention above the swing arm center plane is avoided.

It also is provided, according to this disclosure, that the second sidewall area has a wall section extending downwards from the second section substantially at right angles to the upper side, which in its lower end area is integrally connected to the stiffening girder and has a curved configuration in the direction of the second section. Starting from the connection surface of the spring damper element, this wall section is superimposed with a tensile stress component entered into the load spectrum via the spring damper element and the configuration of the wall section, running largely at right angles to the top side and directed downwards, ensures that this tensile stress component can be absorbed in this profile area with a low wall thickness.

According to a further aspect of the apparatus, the connecting and stiffening girder has a configuration extending from the first sidewall section in the direction of a longitudinal axial center plane of the swing arm. The connecting girder also is integrally formed with a lower wall section of the swing arm opposite the upper side of the swing arm. This configuration ensures that the underside of the swing arm is stiffened with respect to the torsional load introduced into the profile of the single-sided swing arm by the rear wheel of the motorcycle, via the resulting lateral force, and that the center of thrust is shifted to the area below the center plane of the swing arm. This results in a torsionally stiff configuration of the single-sided swing arm, and makes it possible to reduce the dead weight of the single-sided swing arm by reducing the wall thickness of the hollow profile of the swing arm; by this is achieved a material displacement of the torsional stresses into the area of the load-bearing outer fibers of the swing arm or the single-sided swing arm.

As mentioned previously, the single-sided swinging arm according to this disclosure is characterized, among other things, by the fact that it has a thrust center lying below the center plane of the swinging arm, and also by the fact that the single-sided swinging arm has a mounting formed integrally with the single-sided swinging arm at a lower side area opposite the upper side for the detachable fixing of the already mentioned spring damper device.

According to a further aspect of the apparatus, the mounting provided for releasably fixing the spring damper device extends in a downward direction when viewed from the center plane of the swing arm, i.e., into an area which, on the one hand, lies in the area of the edge outer fibers of the structure of the single-sided swing arm (and thus in an area absorbing torsional loads) and, on the other hand, the arrangement of the mounting below the center plane of the swing arm causes a reinforcement of the load-absorbing structure of the single-sided swing arm; the integration of the mounting into the load-absorbing structure takes place without transitions causing notch stresses. This also accounts for the tensile stresses in the load spectrum in the area of the mounting for the spring damper device.

According to a further aspect of the apparatus, the mounting has a frontal area oriented in the direction of a longitudinal center axis of the single-sided swing arm, which has an approximately tangential transition to the frontal wall of the interspace. This approximately tangential design of the support in the area of the front wall of the interstitial space ensures that the above-mentioned tensile forces, which are introduced into the load spectrum via the spring damper element, are introduced as tensile stresses into the front wall area of the interstitial space and thus do not lead to an increase in torsional stresses in this area.

Similarly, according to a further aspect of the apparatus, it is also provided that the mounting has a rear side area aligned in the direction of a longitudinal central axis of the single-sided swing arm, which merges tangentially or largely tangentially into a rear wall of the single-sided swing arm opposite the interspace.

Similar to the above-mentioned, the tensile forces introduced into the mounting of the spring damper element are also introduced into the rear wall at the rear side area in this way largely free of torsional stress as pure tensile forces, whereby the forces acting through the support of the spring damper element on the mounting do not increase the torsional load of the single-sided swing arm according to the invention. This is also helped by the fact that the single-sided swing arm has a V-shaped configuration in the area of the rear wall, viewed in the direction of the longitudinal center axis of the single-sided swing arm; i.e. the forces introduced into the support are largely absorbed as tensile forces in the load spectrum.

Finally, the invention also provides for a motorcycle with a front wheel and a rear wheel and a swing arm as described above.

Figure 2:
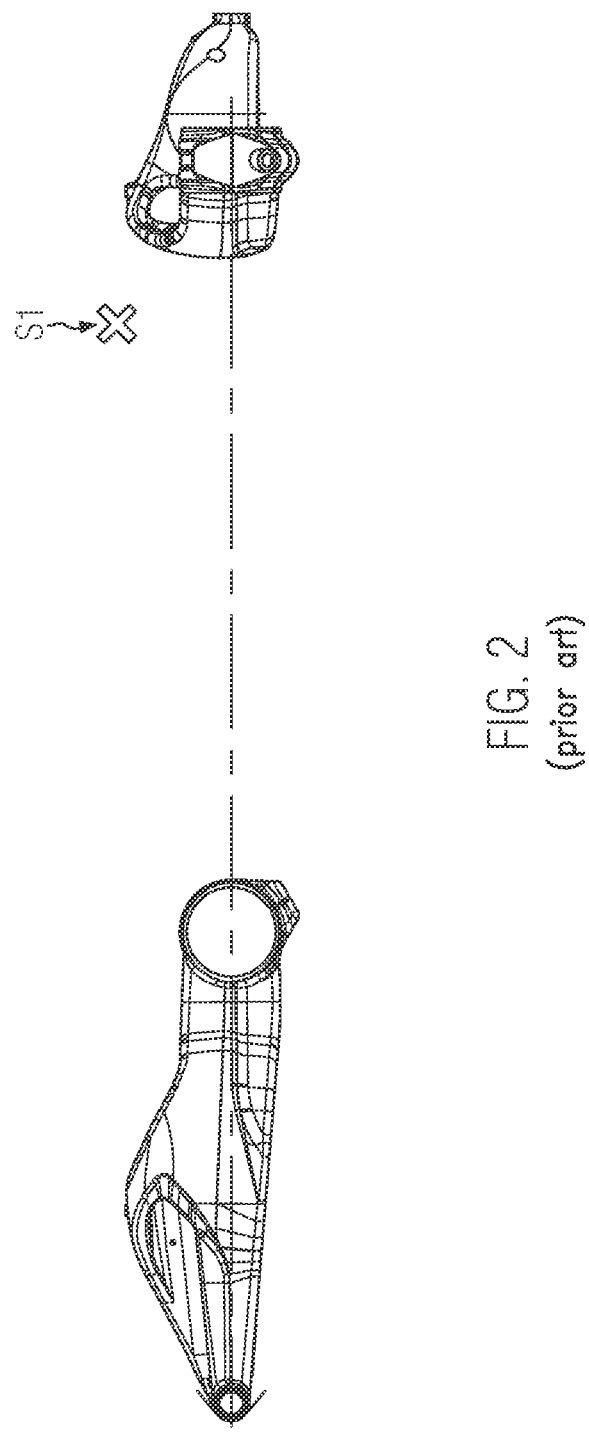
FIG. 2 is a side view of a well-known single-sided swing arm with a swing arm center plane, and showing the position of the thrust center of the well-known single-sided swing arm.

FIG. 1 of the drawings shows schematically a partial side view of a motorcycle with the well-known single-sided swing arm. The single-sided swing arm is used to guide the rear wheel, which is connected via a traction device, usually in the form of a drive chain, to a drive pinion of an unspecified change-speed gearbox. The well-known single-sided swing arm has a passage for the drive chain, whereby the passage is formed by a stiffening girder, which is arranged above a swing arm center plane, illustrated as a dashed line in FIG. 2 of the drawing. FIGS. 1 and 2 show that the well-known single-sided swing arm also spans a swing arm center plane, which has a geometrical center of a first section for receiving the rear wheel of the motorcycle and two sections for the swiveling attachment of the single-sided swing arm to a structural component of the motorcycle. As can be seen from the right-hand illustration in FIG. 2, the thrust center marked "x" of the known single-sided swing arm is located above the swing arm center plane.

Figure 3:
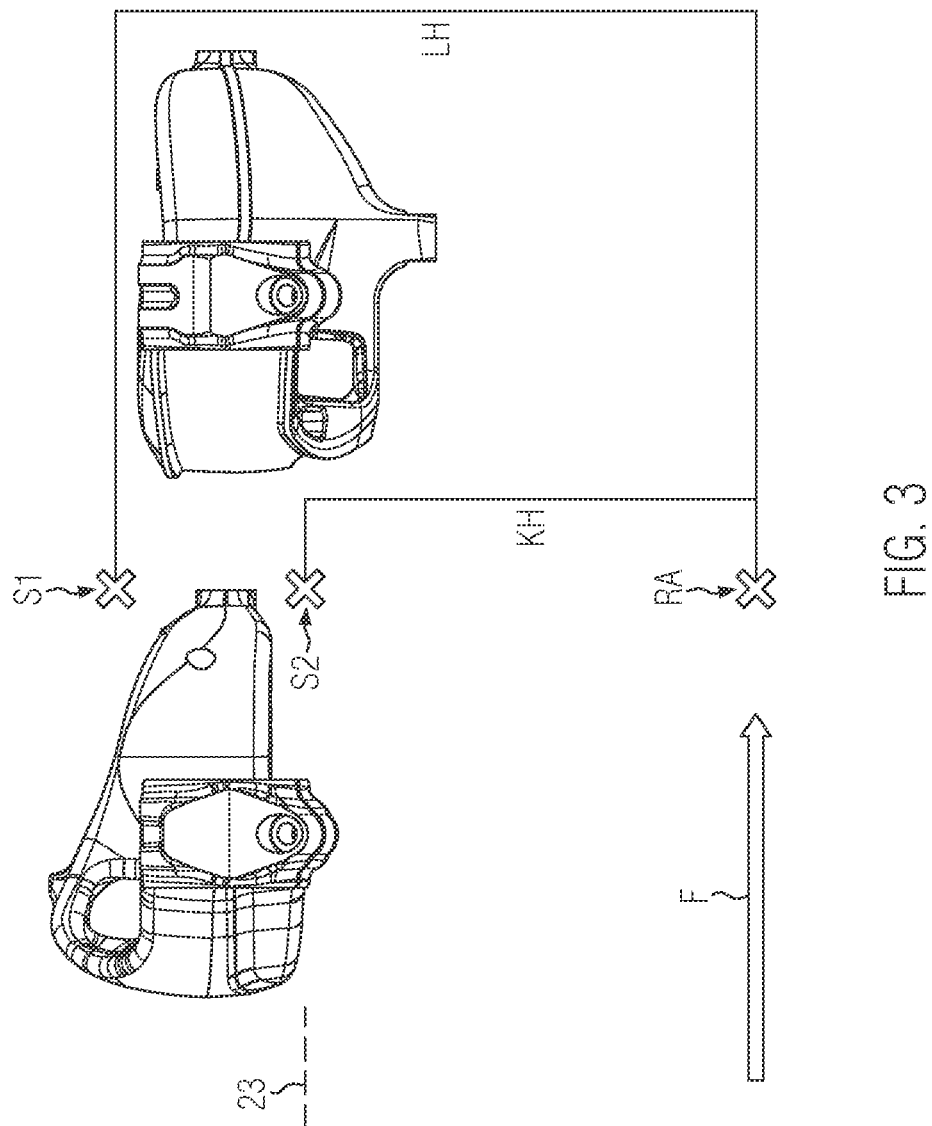
FIG. 3 is a comparative view comparing the known single-sided swing arm (with the position of the center of thrust) with a single-sided swing arm according to the present invention (with the position of the center of thrust)

FIG. 3 shows a comparative view of the known single-sided swing arm on the left side of the figure with the position of the shear center "S1" marked with "x", and the single-sided swing arm of a design according to the present invention with the position of the shear center S2, also marked with "x." At the wheel contact point "RA" marked with "x", the rear wheel of the motorcycle is in contact with the road surface. At this wheel contact point, a lateral force "F" is introduced into the bodywork of the motorcycle when the motorcycle is in motion, via the single-sided swing arm guiding the rear wheel. The lateral force leads to a torsional moment that puts a strain on the single-sided swing arm, which is higher the longer the lever arm is between the center of thrust and the wheel contact point. A long lever arm "LH", as is the case with the well-known single-sided swing arm, therefore leads to a comparatively higher torsional moment than a short lever arm "KH", as is the case with the single-sided swing arm according to the present disclosure. So, the higher the thrust center of the single-sided swing arm is above the wheel contact point, the larger the lever arm, and the greater the torsional moment loading the single-sided swing arm starting from a given lateral force.

Figure 4:
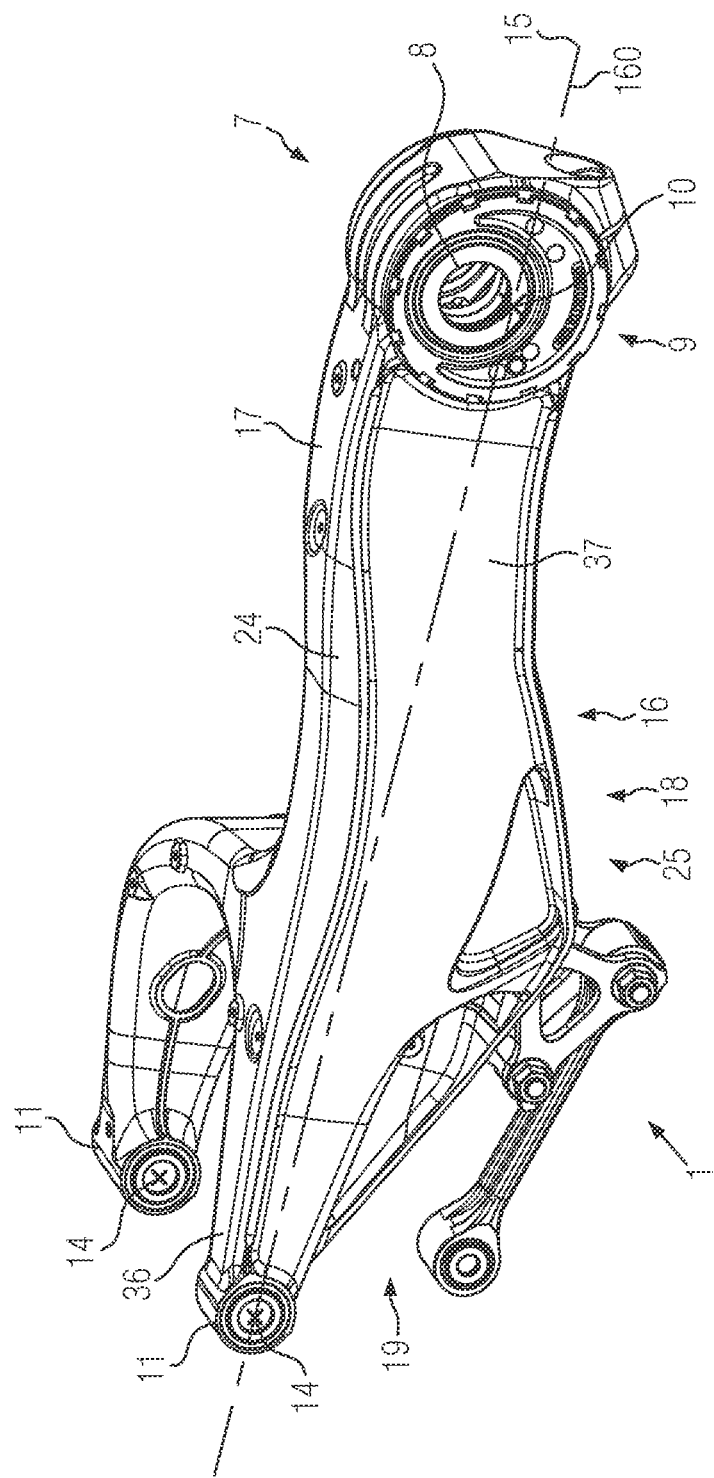
FIG. 4 is a perspective view a single-sided swing arm with the swing arm center plane according to the present invention.
Figure 14:
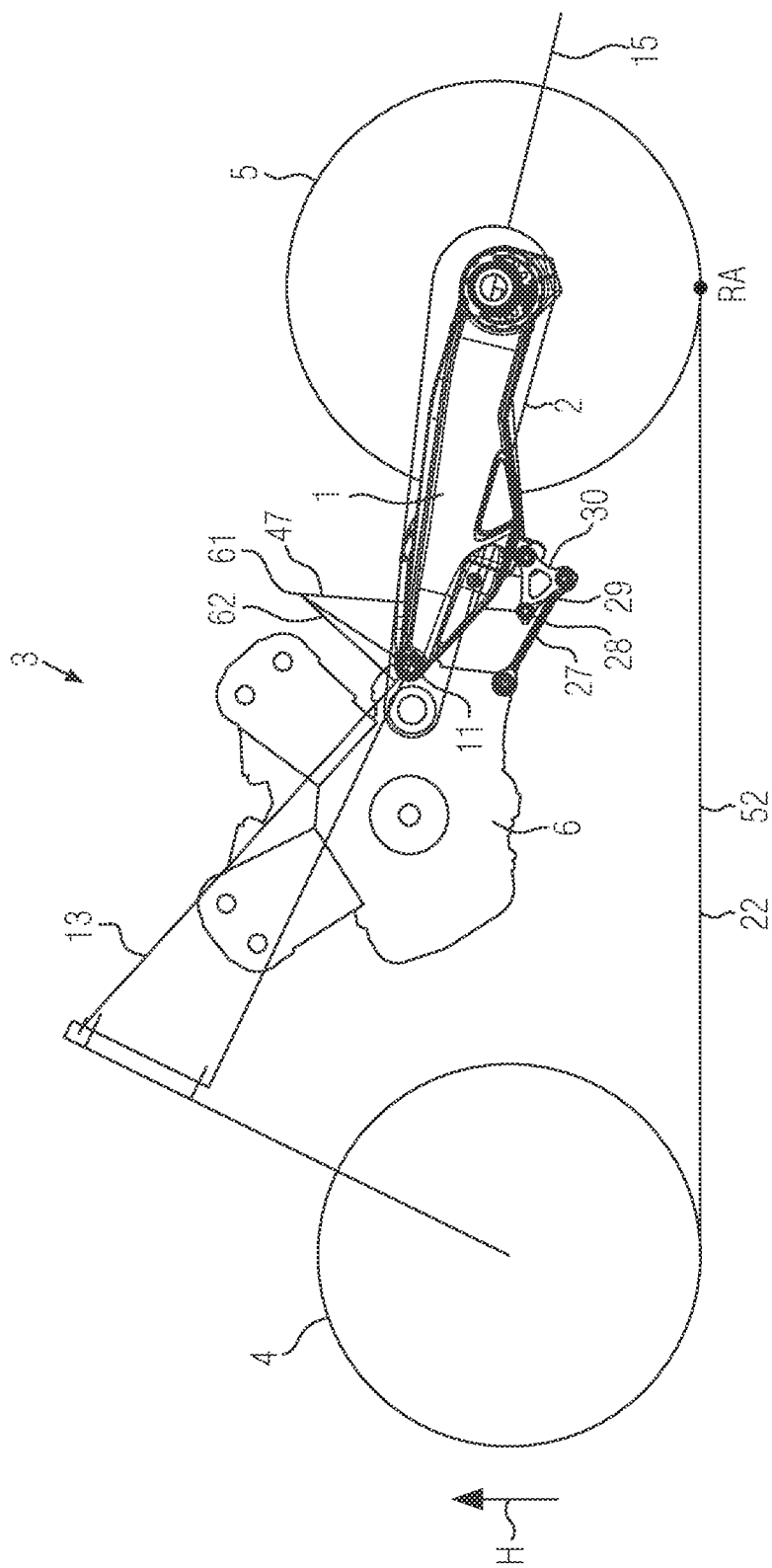
FIG. 14 is a schematic side view diagram of a motorcycle with the single-sided swing arm according to the present invention.

FIG. 4 provides a perspective view of the configuration of a single-sided swing arm 1 according to the present invention. The single-sided swing arm 1 is intended for use with a motorcycle 3 equipped with a chain 2 as the driving means (as shown in FIG. 14). The motorcycle 3 in FIG. 14 has a front wheel 4 and a rear wheel 5, which is guided by the inventive single-sided swing arm 1 and is driven by a drive motor 6 via the chain 2. The rear wheel 5 is received in a first section 7 of the present apparatus by means of an axle, not shown in detail, which passes through recess 8 of the first section 7. Referring again to FIG. 4, the recess 8 in the first section 7 is eccentrically arranged to facilitate the adjustment of the pretension of the drive chain 2, while the first section comprising the receptacle 9 for the rotatable mounting of the rear wheel 5 has a geometrical center 10, discussed further below.

As seen from FIG. 4, the single-sided swing arm 1 has two second sections 11, at the end area opposite to the end area of the first section 7, by means of which the single-sided swing arm 1 can be pivotably fixed to a structural component 12 in the form of a frame 13 of motorcycle 1. The second sections 11 have respective geometrical centers 14 and, together with the geometrical center 10 of the first section 7, form or define a virtual swing arm center plane 15, which is shown in FIG. 4 by the dotted line 160 within the plane.

The swinging arm or swing arm 1 has a rocker arm or swing arm 16 which extends between the first section 7 and the second sections 11. The arm 16 has a upper side 17, a first side wall area 18, and a second side wall area 19 which is located substantially opposite the first side wall area 18; the second side wall area 19 extends to the area of the second section 11 (which is left in the drawing according to FIG. 4). The two side wall areas 18, 19 are connected to each other by means of a stiffening girder 20, as better shown in FIG. 8, and form a passage 21 through which the chain 2 can pass (as shown in FIG. 14). The chain 2 passes through the passage 21 with the return or idle strand of drive chain 2. In this way, the stiffening girder 20 is designed as an underslung girder which extends from the first side wall area 18 to the second side wall area 19, i.e., to an area below the swing arm center plane 15.

Figure 5:
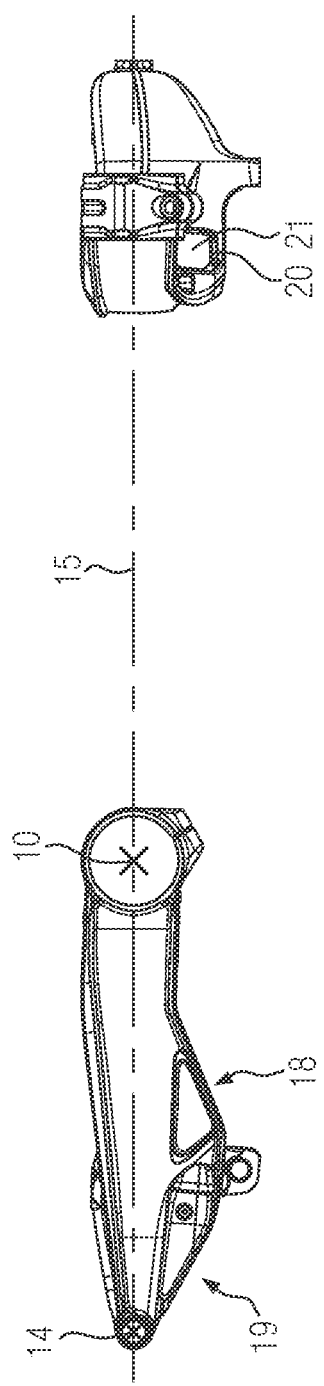
FIG. 5 is a representational view similar to that of FIG. 2, but showing the single-sided swing arm according to the present invention with the position of the center of thrust.

Referring to FIG. 5, the center plane 15 of the swing arm is stretched from the respective centers 10 and 14, and the stiffening girder 20 extends below this center plane 15 of the swing arm; this is so in the intended installation position on motorcycle 3, which is located on the wheel support plane 52 (FIG. 14).

As can be seen from FIG. 14, the motorcycle 3 stands with the front wheel 4 and the rear wheel 5 on the road surface 22, which also represents the wheel support plane 52. The swing arm center plane 15 is oriented at an angle to the road surface 22. FIG. 14 additionally shows a vertical axis direction marked "H" and, viewed in the vertical axis direction, the thrust center of the present single-sided swing arm 1 marked "S2" in FIG. 3 lies below the swing arm center plane 15.

In comparison to the mode described in reference to FIGS. 2 and 3, with the shear center "S1" of the known single-sided swing arm above the swing arm center plane, the shear center "S2" of the present single-sided swing arm 1 is below the swing arm center plane, in the shear center plane 23 having the shear center "S1", while the thrust center "S1" of the known single-sided swing arm is above the swing arm center plane—and thus a predetermined lateral force leads to a higher torsional moment with the known single-sided swing arm than with the single-sided swing arm 1 according to this disclosure.

Figure 6:
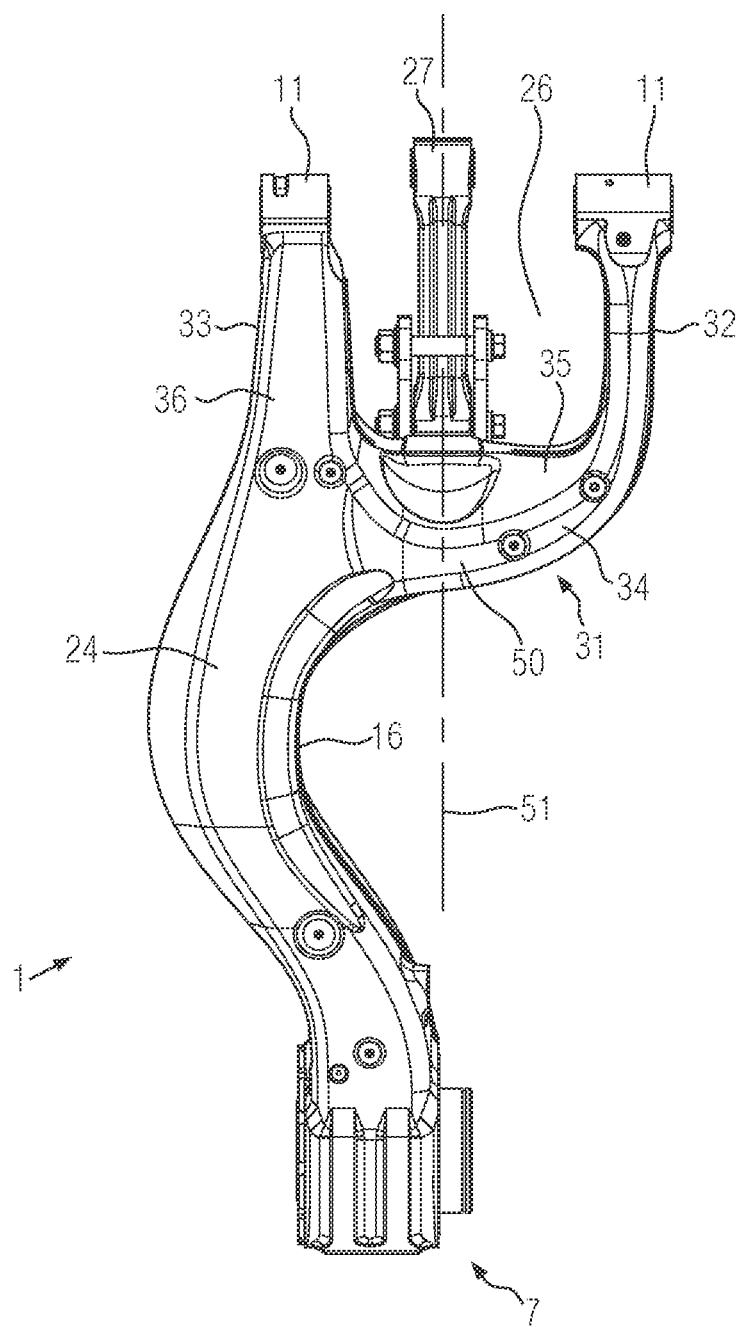
FIG. 6 is a top view of an embodiment of the single-sided swing arm according to the present invention.
Figure 8:
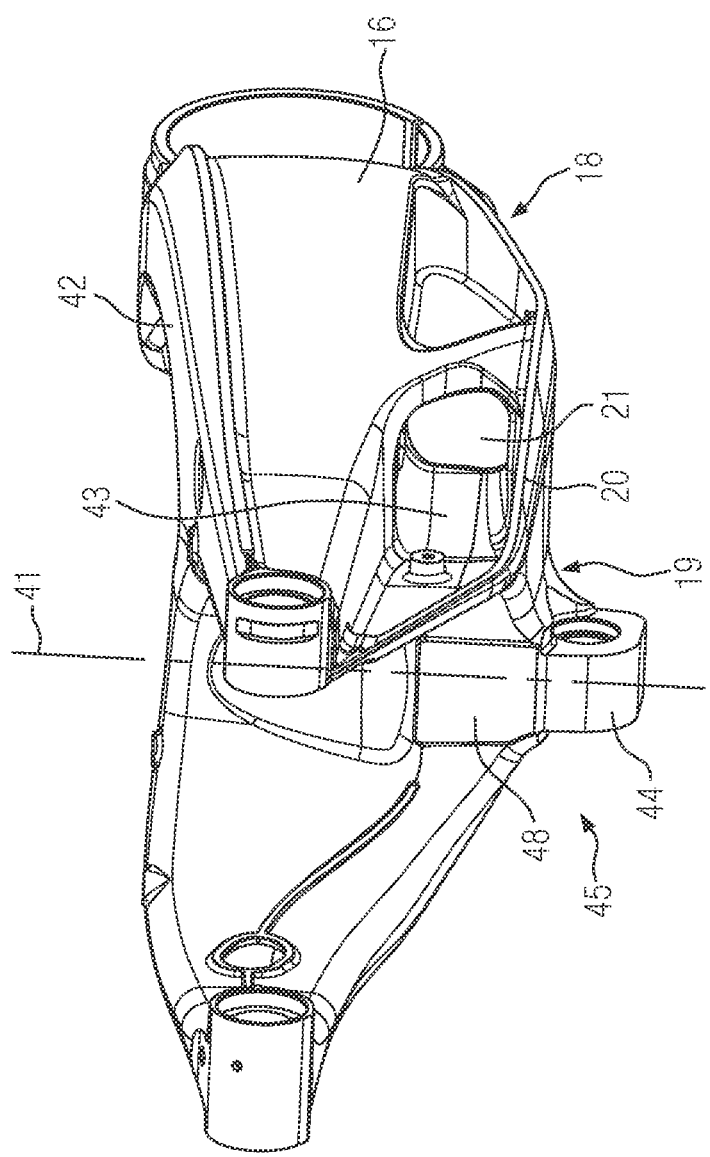
FIG. 8 is a perspective front view of the single-sided swing arm according to the invention.

FIG. 6 depicts a top view from above of the single-sided swing arm 1. As can easily be seen, the rocker arm 16 has a curved configuration extending between the swing arm first section 7 and the second sections 11, and has an upper deck side wall 24 which is generally parallel to the center plane 15 of the swing arm (as suggested in FIG. 4). In addition, the rocker arm 16 has a lower side wall 25 which extends in sections at an angle to the swing arm center plane 15, as seen in FIG. 4. As seen in FIG. 8, this lower side wall 25 is connected in sections to the stiffening girder 20.

Figure 7:
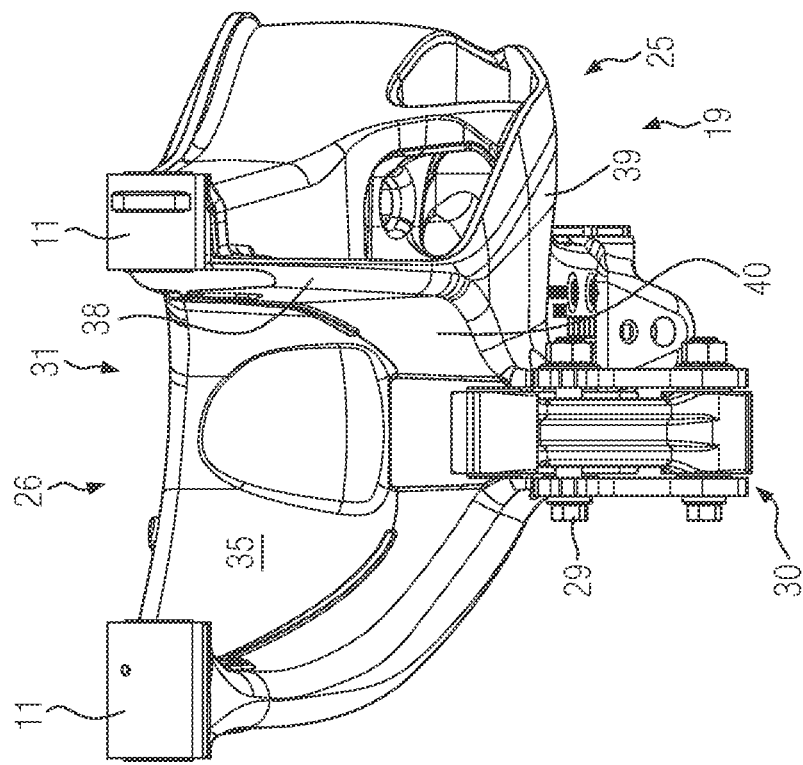
FIG. 7 is a front view of the single-sided swing arm according to the present invention.

FIGS. 6 and 7 illustrate that the two second sections 11 are arranged at a clear or separation distance from each other, and define a spacing 26 which the spring damper device 47 (seen more closely in FIG. 14), can pass through in such a way that it can be fixed, with a lower spring strut eye 28, to the receptacle 29 of a deflector 30. The deflector 30 is supported by the drive motor 6 of the motorcycle 3 via an extension arm 27. A connecting section 31 extends between the two second sections 11. The connecting section 31 has a first arm section 32 and a second arm section 33, and the two arm sections 32, 33 are connected to each other by a curved section 34 which delimits the spacing 26 with a front wall 35 facing the two second sections 11.

As can best be seen from FIG. 4 and FIG. 6, the second arm section 33, which is assigned to the second section 11 (on the left side in FIG. 6), has a first upper cover side wall 36, which is arranged largely parallel to the swing arm center plane 15. The first upper cover side wall 36 has a configuration that widens in the direction of the rocker arm 16, as seen in the plan view according to FIG. 6.

Figure 13:
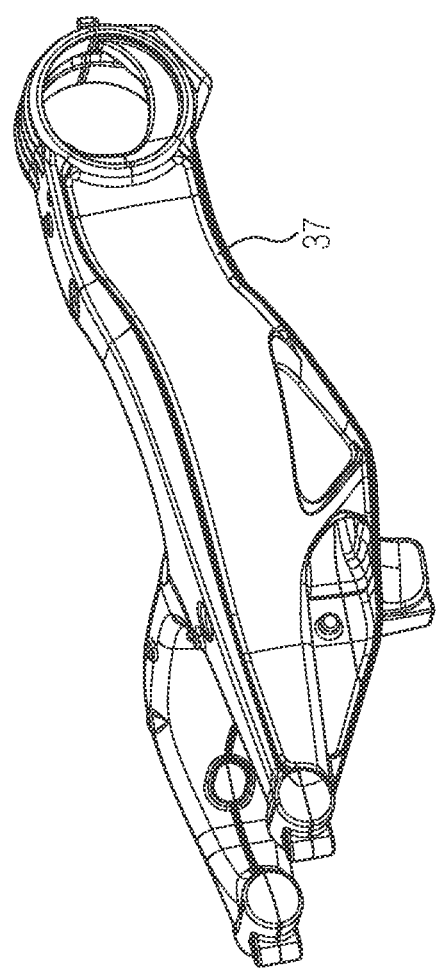
FIG. 13 is an additional side view of the single-sided swing arm according to the invention.

FIG. 4 also shows that the first side wall area 18 has an outer side wall 37 extending from the first section 7 towards the second section 11, and which is substantially flat; FIG. 6 illustrates in a view from above that the rocker arm or swing arm 16 has a cross-sectionally expanding configuration towards the connecting section 31. The largely flat configuration of the outer side wall 37 can also be seen in FIG. 13. It can be provided in the case of the invention-compliant single-sided swing arm 1, which can be produced by means of a gravity die casting process, by means of a lateral slide of the mold tool (not shown). This reduces the machining effort to fabricate the single-sided swing arm 1, since time-consuming manual machining of a graduation burr of the swing arm is no longer necessary.

The rocker arm 16 has an expanding configuration from the first section 7 towards the connecting section 31 to accommodate the torsional load changing from the first section 7 towards the second section 11.

As can best be seen from FIG. 7, the second side wall area 19 has a wall section 38 extending from the second section 11 largely at right angles to the upper side or upper deck side wall 24 in the downward direction, which in the lower area 39 is integrally connected to the stiffening girder 20, and has a curved configuration with a surface 40 in the direction of the other second section 11.

FIG. 8 illustrates that the stiffening girder 20 has a configuration extending from the first side wall area 18 towards a longitudinal axial center plane 41 of the swing arm 1. The stiffening girder 20 is integral with a lower wall area 43 of the swing arm 1 opposite the upper side 42 of the rocker arm 16. This configuration provides a self-contained profile for absorbing torsional stresses, which are transmitted to the single-sided swing arm 1 via the wheel contact force and the lateral force. The swing arm 1 has a mounting 44 which is integrally formed with the swing arm in the area of the underside 45 of the swing arm 1, and is provided for the detachable fixing of a deflection or lever deflector 30, as shown in more detail in FIG. 7, to which deflection in turn the spring damper device 47 (FIG. 14) can be removably attached. This configuration ensures that the geometric progression of the strut kinematics can be significantly increased compared to the geometric progression of the strut kinematics in combination with the known single-sided swing arm, namely from an overall progression of about 5% to about 19%.

As can be seen from the drawing figures, the mounting 44 extends downwards when viewed from the swing arm center plane 15 and, as can be seen particularly from FIG. 8, has a largely tangential transition to the front wall 35 at the front end—i.e. the end region facing the front wall 35 of the spacing 26—so that the forces introduced into the mounting 44, which are largely in the form of tensile forces, are supported on the single-sided swing arm 1; such forces thus do not increase the torsional load on the single-sided swing arm 1. A reinforcing section 48 additionally can be provided on the front wall 35, which represents a slight accumulation of material and thus increases the wall cross-section of the swing arm 1, which exhibits the tensile stresses, and thus reduces the level of tensile stress. Similarly, as shown in FIG. 9, the mounting 44 has a largely tangential transition area into a rear wall 49 of the swing arm 1, which is opposite the spacing 26, and in this way the load spectrum of the spring damper forces introduced into the mounting 44 is largely introduced into the swing arm 1 in the form of tensile stresses.

Figure 9:
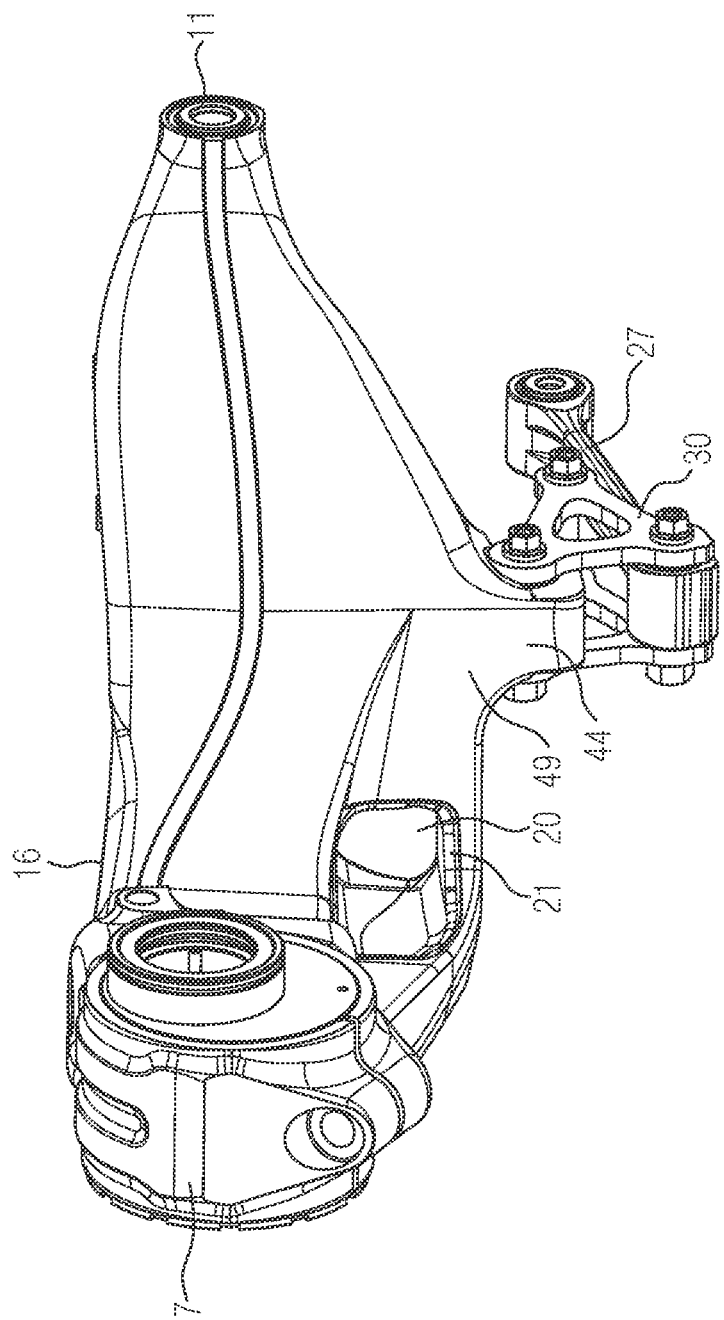
FIG. 9 is a perspective rear view of the single-sided swing arm according to the invention.

As also shown in FIGS. 7 and 9, the single-sided swing arm 1 in the area of the connecting section 31 has a V-shaped configuration when viewed from an second upper cover side wall 50 of the connecting section 31 in the direction of a longitudinal axis 51. This configuration contributes on the one hand, in that stresses introduced into the single-sided swing arm 1 via the mounting 44 are homogeneously introduced into the connecting section 31 and, on the other hand, the shear center "S2" of the single-sided swing arm 1 according to the invention can be displaced in the direction closer to the wheel support plane 52; in this way, the lever arm between the wheel support point "RA" of the rear wheel 5 and the shear center "S2" of the single-sided swing arm 1 according to the invention can be reduced.

Figure 10:
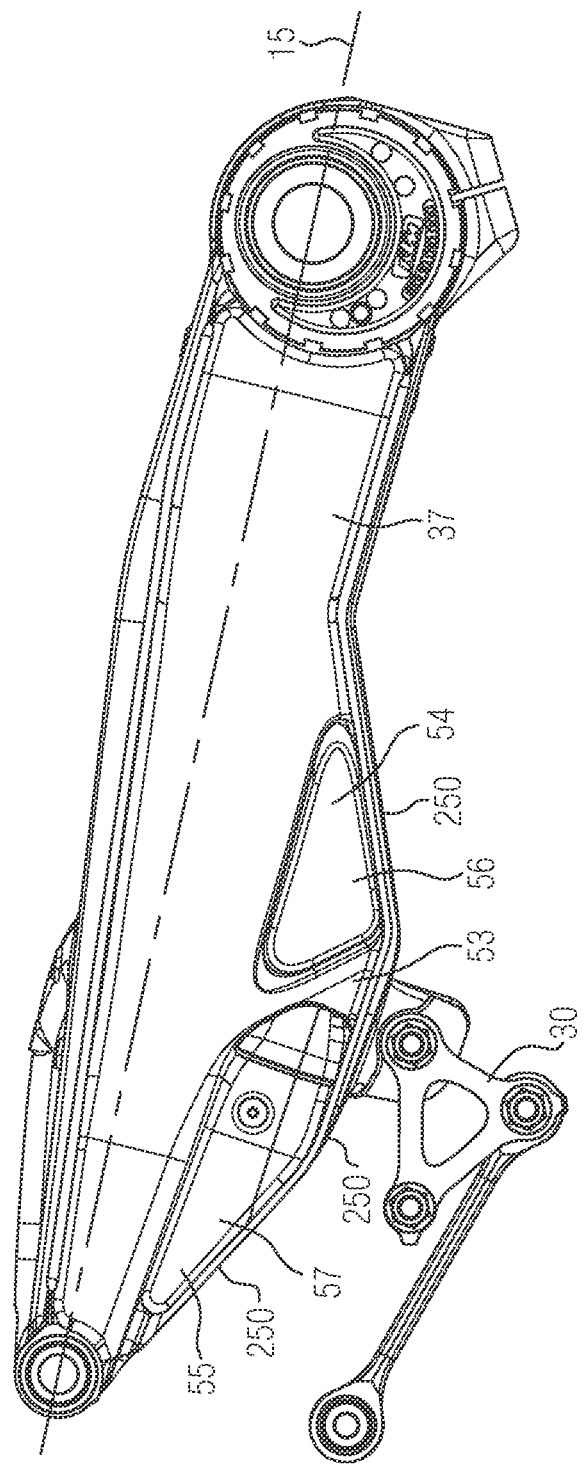
FIG. 10 is a side view of the single-sided swing arm according to the invention.

FIG. 10 offers a side view of the single-sided swing arm 1 according to a design of the present invention. As can easily be seen, the lower side wall 25 has several sections 250 which are aligned at an angle to the center plane 15 of the swing arm and, as can be seen from FIG. 8, the sections 250 of the lower side wall 25 are integrally connected to the stiffening girder 20, thus creating a torsionally stiff configuration. The outer side wall 37 has a web section 53 which is integrally connected to the lower side wall 25; a reduction in the dead weight of the single-sided swing arm 1 is achieved via recesses 54, 55 in the area of the outer side wall 37, the lower side wall 25 being formed integrally with the rocker arm 16 by thin-walled connecting sections 56, 57.

Figure 11:
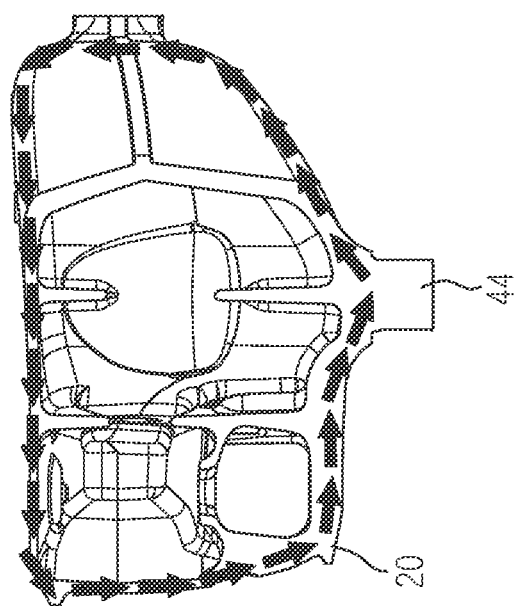
FIG. 11 is a cross-sectional view from behind the single-sided swing arm, as used in the invention, to illustrate the torsional stress curve.

In the following, reference is made to FIG. 11 of the drawings, which represents a cross-sectional view from the view of the first section 7 in the direction of the second sections 11. The mounting 44 with its tangential transitions to the front wall 35 and to the rear wall 49 is integrated into the load-bearing structure of the single-sided swing arm 1, and the flow of force under torsional loading of the invention's single-sided swing arm is illustrated by the directional arrows. In particular, this FIG. 11 also makes it clear that the stiffening girder 20 is integrated into the load-bearing structure and makes a significant contribution to absorbing the torsional load.

Figure 12:
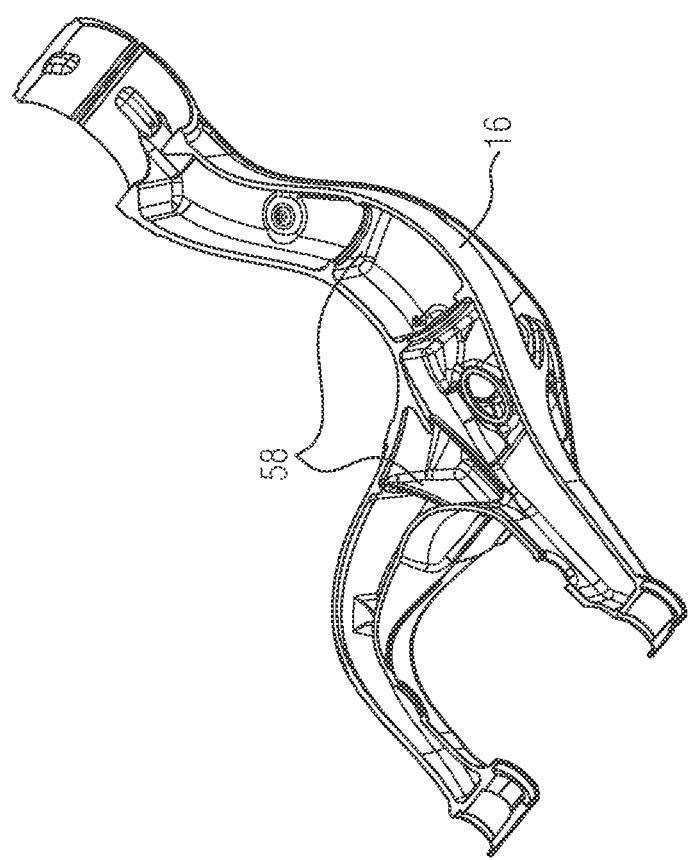
FIG. 12 is a perspective sectional view of the single-sided swing arm used in the invention, and showing stiffening ribs.

FIG. 12 illustrates that the single-sided swing arm 1 has largely vertically arranged stiffening struts 58, particularly in the area of the rocker arm 16 and the first arm section 32, which increase the load-bearing capacity of the single-sided swing arm 1. These struts 58 also allow a much simpler production of the single-sided swing arm 1, as the profile can be produced by using only two cores in the casting tool (compared to the necessity of using three cores when using a horizontal strut in a known swing arm).

Finally, FIG. 14 shows the wheel support plane 52 and the motorcycle 3 supported thereon by the front wheel 4 and rear wheel 5, which is shown stylized in the drawing, and has a frame 13 on which the present single-sided swing arm 1 is pivotably supported by the two front sections 11, while the deflector 30 is supported by the schematically shown drive motor 6 via the extension arm 27. The spring damper device 47 is supported with the lower eye 28 on the support 29 and with the upper eye 61 on a boom 62 belonging to the frame 13.

The single-sided swing arm according to the present invention allows a substantial lowering of the thrust center of the swing arm, and thus a reduction of the torsional load acting on the swing arm from the lateral force of the rear wheel, which in turn leads to a significant reduction of the torsional stresses acting in the structure of the single-sided swing arm with assumed constant wall thickness compared to the known single-sided swing arm, which in turn can be used to reduce the wall thickness of the single-sided swing arm according to the invention compared to the wall thickness of the known single-sided swing arm. In this way, a reduction of the dead weight of the invention's single-sided swing arm compared to the known single-sided swing arm is also achieved.

By integrating a mount in the structure of the single-sided swing arm in the area of the underside of the single-sided swing arm, the geometric progression ratio of the spring damper kinematics can be significantly increased, which can also be used in particular to allow the working travel of the working piston in the spring damper element to increase progressively as the wheel travel of the rear wheel increases, thereby improving the tunability of the damper work.

With regard to features of the invention not explained in detail above, explicit reference is made to the patent claims and the drawing.

LIST OF REFERENCE SIGNS 1. single-sided swing arm
2. chain
3. motorcycle
4. front wheel
5. rear wheel
6. drive motor
7. first section
8. recess
9. receptable
10. geometrical center
11. second sections
12. structural component
13. frame
14. geometrical center
15. swing arm centre plane
16. swing arm
17. upper side
18. first side wall area
19. second side wall area
20. stiffening girder
21. passage
22. road surface
23. shear center plane
24. upper deck side wall
25. lower side wall
26. spacing
27. extension arm
28. lower strut eye
29. recess
30. reflector
31. connecting section
32. first arm section
33. second arm section 34. curved section
35. front wall
36. upper cover side wall
37. outer side wall
38. wall section
39. lower area
40. surface
41. longitudinal central plane
42. upper side
43. lower wall area
44. mounting
45. underside
46. lever deflector
47. spring damper device
48. reinforcing section
49. rear wall
50. second cover side wall
51. longitudinal axis
52. wheel support plane
53. bar section
54. recess
55. recess
56. connection section
57. connection section
58. stiffening strut
61. eye
62. extension arm
160. line
250. sections
S1. shear center
S2. shear center
LH. Long lever arm
KH. Short lever arm
RA. Wheel contact point
F. lateral force
H. vertical axis direction

What is claimed is:

1. A single-sided swing arm (1) for a motorcycle (3) having a traction means (2) for driving a rear wheel (5) of the motorcycle (3), the swing arm (1) having a first section (7) for rotatably supporting the rear wheel (5) and second sections (11) for pivotally attaching the swing arm (1) to a structural component (12) of the motorcycle (3),
wherein geometrical centers (10, 14) of the first section (7) and of the second sections (11) define a virtual swing arm center plane (15), and a rocker arm (16) having an upper side (17) is provided between the first and the second sections, which rocker arm (16) has a first side wall area (18) and a second side wall area (19) substantially opposite thereto, and the second side wall area (19) extends into the region of a second section (11) and the two side wall areas are connected to one another by a stiffening girder (20) designed for the passage of the traction means (3), and
wherein the stiffening girder (20) extends into a region below the swing arm center plane (15).

2. The swing arm (1) according to claim 1, wherein the rocker arm (16) has a configuration extending from the first section (7) towards the second section (11) in a curved configuration, and the upper side (17) has an upper deck side wall (24) arranged substantially parallel to the swing arm center plane (15).

3. The swing arm (1) according to claim 1, wherein the rocker arm (16) has a lower side wall (25) which extends at least in sections at an angle to the swing arm center plane (15) and is connected at least in sections to the stiffening girder (20).

4. The swing arm (1) according to claim 3, wherein the rocker arm (16) has a widening configuration from the first section (7) towards a connecting section (31) in a plan view.

5. The swing arm (1) according to claim 3, wherein the stiffening girder (20) has a configuration extending from the first side wall area (18) in a direction of an axial longitudinal center plane (41) of the swing arm (1), and the stiffening girder (20) is integrally formed with a lower area (39) of the swing arm (1) opposite the upper side of the swing arm.

6. The swing arm (1) according to claim 3, wherein the swing arm (1) has a shear center (S2) located below the swing arm center plane (15).

7. The swing arm (1) according to claim 3, wherein the swing arm (1) has a mounting (44) formed integrally with the swing arm (1) on a lower side region opposite the upper side, for releasably fixing a spring damper device (47).

8. The swing arm (1) according to claim 7, wherein the mounting (44) extends in a downward direction when viewed from the swing arm center plane (15).

9. The swing arm (1) according to claim 7, wherein the mounting (44) has a front region which is aligned in a direction of a longitudinal central axis of the single-sided swing arm (1) and has an approximately tangential transition to the front wall (35) of an intermediate spacing (26).

10. The swing arm (1) according to claim 7, wherein the mounting (44) has a rear side region which is aligned in a direction of a longitudinal central axis of the single-sided swinging arm (1) and merges tangentially into a rear wall (49) of the single-sided swinging arm (1) opposite an intermediate spacing (26).

11. The swing arm (1) according to claim 10, wherein the single-sided swinging arm (1) has a V-shaped configuration in the region of the rear wall (49) as viewed in a direction of the longitudinal axis of the single-sided swinging arm (1).

12. The swing arm (1) according to claim 1, wherein the second sections include two second sections (11) that are arranged at a separation distance from each other and form an intermediate spacing (26), and a connecting section (31) extends from a first of the two second sections (11) towards a second of the two second sections (11), and the connecting section (31) forms a respective arm section (32, 33) starting from the respective second section (11) and the arm sections (32, 33) are connected to each other by means of a curved section (34) and the curved section (34) delimits the intermediate spacing (26) with a front wall (35) facing the two second sections (11).

13. The swing arm (1) according to claim 12, wherein a second arm section (33) associated with the second side wall area (19) has an upper cover side wall (36) which is arranged substantially parallel to the swing arm center plane (15), and has a configuration widening in a direction towards the rocker arm (16) in a plan view.

14. The swing arm (1) according to claim 12, wherein the second side wall area (19) has a wall section (38) extending downwards from the second second section (11) substantially at right angles to an upper deck side wall (24), which in a lower area (39) is integrally connected to the stiffening girder (20) and has a curved configuration in a direction of the first second section (11).

15. The swing arm (1) according to claim 1, wherein the first side wall area (18) has an outer side wall (37) which extends from the first section (7) in a direction of a second section (11), and is configured as largely flat, and the rocker arm (16) has a configuration which widens in cross-section from the second section (11) in a direction of a connecting section (31).

16. A motorcycle (3) having a front wheel (4), a rear wheel (5), and a single-sided swing arm (1) according to claim 1.

\* \* \* \* \*